United States Patent Office 3,499,943
Patented Mar. 10, 1970

3,499,943
PROCESS FOR PREPARING CHLOROFLUORO-
METHANES
Ferenc M. Pallos, Concord, and Attila E. Pavlath,
Berkeley, Calif., assignors to Stauffer Chemical
Company, New York, N.Y., a corporation of Delaware
No Drawing. Filed Dec. 7, 1965, Ser. No. 512,190
Int. Cl. C07c 17/00
U.S. Cl. 260—653    3 Claims

ABSTRACT OF THE DISCLOSURE

A process for preparing chlorofluoromethanes, such as, dichlorodifluoromethane by reacting the inorganic fluorochloro complex $[AsCl_4]^+[AsF_6]^-$ or $[SbCl_4]^+[SbF_6]^-$ with carbon disulfide, preferably at autogenous pressure and at a temperature between about 100° and 300° C. and isolating the chlorofluoromethanes.

---

This invention relates to a new and novel process of preparing fluorine-containing organic compounds. More particularly, it relates to a process of preparing completely halogenated methanes wherein at least one of the halogen atoms is fluorine and any other halogen is chlorine.

The chlorofluoromethanes, such as trichloromonofluoromethane and especially dichlorodifluoromethane, are extremely valuable compounds. They find extensive use as refrigerant liquids, as dielectric fluids, as blowing agents for plastic foams, and as propellants in aerosols.

This invention has as a principal object a new and novel process for preparing chlorofluoromethanes. Another object is provision of a process for preparing said chlorofluoromethanes by a new reaction involving a heretofore unknown reaction.

Pursuant to the above-mentioned and yet further objects it has been found that chlorofluoromethanes may be prepared by the reaction of carbon disulfide with the inorganic fluoro-chloro-arsenic complex, $[AsCl_4]^+[AsF_6]^-$ or with the inorganic fluorochloro-antimony complex, $[SbCl_4]^+[SbF_6]^-$.

The active fluoroinating agent in the reaction mixture is the fluorochloro arsenic or antimony complex. The preparation of this species can be carried out either in situ or in substantia. The physical properties of the fluorochloro complexes are described in the literature by L. Kolditz (Zeit Anng. Allg. Chem., 280, 313–20 (1955) and 310, 236–41 (1961)). In general, the complexes can be conveniently prepared in conventional glass equipment. Arsenic or antimony trifluoride preferably should be chlorinated with a stoichiometric amount of chlorine or an excess thereof to form the appropriate complex. The complex is quite soluble in arsenic trifluoride and thus even an excess of $AsF_3$ could be used. A small amount of water which acts as a catalyst may be added to the arsenic trifluoride before the addition or chlorine is begun to increase the speed of reaction.

The respective proportions of carbon disulfide and the inorganic fluorochloro complex are not critical. The reaction will take place over a wide range of conditions and reactant ratios; however, there exist certain limits which make the reaction more feasible. It is desirable to use the two reactants in the molar ratio of at least 2:1, complex to carbon disulfide. Our preferred ratio is at least 4 moles of complex to 1 mole of carbon disulfide. When the complex is to be prepared in situ the preferred molar ratio of reactants is at least 2:2:1, arsenic or antimony trifluoride to chlorine to carbon disulfide.

The reaction produces a mixture of products. However, conditions can be varied to favor the formation of specific compounds. The three possible chlorofluoromethanes are formed, principally chlorotrifluoromethane and dichlorodifluoromethane. In general, the reaction involves the replacement of a doubly bonded sulfur atom to a carbon atom with the elements of chlorine and fluorine. The active species promoting this replacement is the fluorochloro complex. The applicants do not fully understand the mechanism involved and therefore do not wish to be limited to any specific mode of reaction. However, it is thought that first there is an addition of fluorine and chlorine across the carbon-sulfur double bond, followed by a cleavage of the resulting carbon-sulfur single bond and the further addition of halogens thereto, forming the desired chlorofluoromethanes. Within the scope of the above-described reaction is the utility of such compounds that contain carbon-sulfur double bonds. As for example, thiocarbonyl dichloride ($CSCl_2$). It is possible that in thiocarbonyl dichloride the sulfur could be replaced by a chlorine and fluorine to produce chlorofluoromethanes according to the present invention.

The reaction can be carried out at atmospheric pressure, for example by adding carbon disulfide to a solution of active fluorinating agent, $[AsCl_4]^+[AsF_6]^-$ or $[SbCl_4]^+[SbF_6]^-$, and heating the solution. Due to the high volatility of the carbon disulfide conversions are lower when operating at atmospheric pressure. It is therefore more favorable to conduct the reaction under the autogenous pressure developed by the reactants and products at the operating temperature. It is preferred to carry ou the reaction in a pressure vessel.

The reaction between carbon disulfide and the fluorochloro complex to give the chlorofluoromethanes may be carried out at various temperatures depending upon whether the reaction is conducted at atmospheric or autogenous pressures. At atmospheric pressure, while collecting the gaseous products formed, the temperature may be taken as high as operability permits. A temperature range of 80° to 100° C. is satisfactory and conveniently obtainable. When operating under pressure appreciable conversions are obtained at temperatures in excess of 100° C. The reaction temperature can be much higher, but there is normally no advantage in using temperatures above about 300° C. The preferred temperature range is from about 200° C. to about 250° C.

The reactor is agitated to facilitate intimate contact of the reactants. Normally, the reaction under pressure is allowed to proceed for at least one hour and preferably for five to eight hours. Longer reaction times can be used as operating conditions dictate to obtain satisfactory conversions. At atmospheric pressure the reaction is carried out for a sufficient length of time as to offer maximum conversion to the chlorofluoromethanes.

A convenient procedure for conducting the reaction of the present invention consists in mixing together the reactants, carbon disulfide and the selected fluorochloro complex, in a pressure vessel. The pressure vessel was suitably equipped with pressure indicating means. After sealing the reactants in the pressure vessel, the vessel is agitated as on a shaker, a rocking mechanism or by stirring. Suitable means for heating the pressure vessel to the desired temperature is employed. After reaction for the required time, the reactor is cooled and the gases collected in a low temperature trap. The gases thus collected can then be cleaned by passing through a caustic solution to remove acidic vapors and separated by conventional fractionation techniques.

The following examples illustrate the process of this invention.

EXAMPLE 1

Seven hundred and fifty milliliters of arsenic trifluoride was placed in a lecture bottle. Chlorine gas was bubbled into it until approximately 40 percent of the arsenic trifluoride was converted to the active species complex, $[AsCl_4]^+[AsF_6]^-$. To this was then added 126 grams of carbon disulfide. The lecture bottle was closed and placed on a shaking device. The lecture bottle and its contents were heated to 200–230° C. for seven hours, under autogenous pressure developed by the reactants and reaction products. After cooling to room temperature the gaseous reaction products were passed through a 30 percent aqueous solution of potassium hydroxide to remove any acidic contaminant gases. The reactor was warmed to 50° C. until no more gaseous material was removed. The gases were collected in a −78° C. (Dry Ice-isopropyl alcohol) trap. Approximately 160 grams of low boiling liquid was obtained. The composition as determined by vapor phase chromatography was: 75 percent dichlorodifluoromethane, 15 percent chlorotrifluoromethane, 2 percent trichloromethane and 8 percent miscellaneous sulfur containing compounds.

EXAMPLE 2

One hundred milliliters of arsenic trifluoride was chlorinated until no more chlorine absorption could be noticed. This converted approximately 40 percent of the arsenic trifluoride to the complex, $[AsCl_4]^+[AsF_6]^-$. The excess arsenic trifluoride was removed in vacuo. To the complex in a glass reactor at atmospheric pressure was added 14.5 grams of carbon disulfide. This mixture was heated slowly up to 90° C. The evolving gases were purified as described in Example 1, supra. There was obtained seven grams of a low boiling mixture which analyzed by vapor phase chromatography to contain 95 percent dichlorodifluoromethane.

EXAMPLE 3

136 grams $SbF_3$ and 140 grams $Cl_2$ were placed in a 300 ml. lecture bottle. This lecture bottle was then heated to about 60° C. and constantly agitated. After cooling the same, the lecture bottle was evacuated to remove unreacted chlorine. 54 grams of the complex $$[SbCl_4]^+[SbF_6]^-$$

were formed.

7.5 grams of $CS_2$ were then added to this lecture bottle containing the complex and the same was heated by two infrared lamps to approximately 60° C. This temperature was maintained for three hours while the lecture bottle was constantly agitated. Thereafter, the lecture bottle was placed into an oil bath heated to 180° C. and remained in said bath for 2 hours. After cooling to 60° C., the gaseous reaction products were passed through a 30% aqueous solution of KOH and then collected in an acetone-Dry Ice trap. The reaction yielded $CF_2Cl_2$ (38%) and $CFCl_3$ (5%).

Whereas, the active fluorinating species in the foregoing examples were prepared in substantia, it is within the scope of the present invention to prepare the fluorinating species in situ. This could be done by adding chlorine to a mixture of selected trifluoride and carbon disulfide under the desired reaction conditions.

Various changes and modifications may be made in the process described herein as will be apparent to those skilled in the chemical arts. It is accordingly intended that the present invention shall only be limited by the scope of the appended claims.

We claim:
1. The process for preparing at least one member of the group consisting of the chlorofluoromethanes, which comprises reacting an inorganic fluorochloro complex selected from the group consisting of $[AsCl_4]^+[AsF_6]^-$ and $[SbCl_4]^+[SbF_6]^-$ with carbon disulfide, and isolating said chlorofluoromethanes.

2. A process as stated in claim 1 wherein the reaction is carried out at superatmospheric pressure and at temperatures above 100° C.

3. A process as stated in claim 1 wherein the reaction is carried out at atmospheric pressure.

References Cited

UNITED STATES PATENTS

| 3,321,537 | 5/1967 | Walker et al. | 260—653 |
| 3,367,984 | 2/1968 | Pallos et al. | 260—653 |
| 2,104,695 | 1/1938 | Gleave | 260—653.6 |
| 2,972,637 | 2/1961 | Tullock | 260—653 |

OTHER REFERENCES

Stacey, Advances in Fluorine Chemistry vol. 4, p. 208–212 (1965).

DANIEL D. HORWITZ, Primary Examiner